United States Patent
Huang

(10) Patent No.: US 6,199,238 B1
(45) Date of Patent: Mar. 13, 2001

(54) MACHINE FOR CLEANING COMPACT DISC

(76) Inventor: Ching-Chuan Huang, No. 115, Tai Tun 19 Street, Hsi Chun Area, Taichung (TW)

(*) Notice: Subject to any disclaimer, the term of this patent is extended or adjusted under 35 U.S.C. 154(b) by 0 days.

(21) Appl. No.: 09/429,648

(22) Filed: Oct. 29, 1999

(51) Int. Cl.[7] .............................. A47L 25/00; B08B 11/02; G11B 3/58
(52) U.S. Cl. ................................. 15/102; 15/97.1
(58) Field of Search ............................... 15/21.1, 77, 97.1, 15/102, DIG. 12, DIG. 13, DIG. 14

(56) References Cited

U.S. PATENT DOCUMENTS

| | | | |
|---|---|---|---|
| 4,561,142 | * 12/1985 | Mischenko et al. | 15/97.1 |
| 4,654,917 | * 4/1987 | Yeung | 15/97.1 |
| 4,783,870 | * 11/1988 | Yeung | 15/97.1 |
| 4,817,078 | * 3/1989 | Iwata | 15/DIG. 12 |
| 4,825,497 | * 5/1989 | Nagao et al. | 15/97.1 |
| 5,228,022 | * 7/1993 | Compton et al. | 15/97.1 |
| 5,537,706 | * 7/1996 | Baker | 15/102 |
| 5,584,089 | * 12/1996 | Huang | 15/102 |
| 5,963,526 | * 10/1999 | Lee | 15/97.1 |

FOREIGN PATENT DOCUMENTS

1214209 * 1/1990 (IT).

* cited by examiner

Primary Examiner—Terrence R. Till
(74) Attorney, Agent, or Firm—Browdy and Neimark

(57) ABSTRACT

An automatic machine is designed for cleaning a compact disc and is formed of a housing, a motor, a transmission mechanism, a disc carrying seat, an application device, a drying device, a first lifting mechanism, a second lifting mechanism, and a control device. The motor is housed in the housing and controlled by the control device. The power of the motor is transmitted by the transmission mechanism to drive the disc carrying seat on which a compact disc to be cleaned is rotatably located. The application device is driven by the power of the motor via the transmission mechanism to rotate. The first lifting mechanism is disposed in the housing and is located between the transmission mechanism and the application device to drive the application device to move toward or away from the disc carrying seat. The second lifting mechanism is located between the transmission mechanism and the drying device for driving the drying device to move toward or away from the disc carrying seat.

11 Claims, 6 Drawing Sheets

MACHINE FOR CLEANING COMPACT DISC

FIELD OF THE INVENTION

The present invention relates generally to a compact disc cleaning machine, and more particularly to a machine for cleaning a compact disc such that the compact disc is automatically applied on with a liquid cleaning agent before cleaning, and that the compact disc is automatically dried after cleaning.

BACKGROUND OF THE INVENTION

The compact disc (CD), DVD, VCD are widely used to store the data. The reading of the data stored in the compact disc is done by a laser device. The quality of the data reading may be undermined by the fingerprints, dirt, or other foreign objects, which are often the main culprits of the mechanical breakdown of the laser device.

The conventional machines for cleaning the compact disc are capable of cleaning and drying a compact disc. The cleaning process of the conventional machines involves the manual spreading of a liquid cleaning agent on a compact disc to be cleaned in the machine. The compact disc is cleaned and dried by the machine. The liquid cleaning agent is made of a volatile liquid, which is harmful to the human skin. In addition, the volatile liquid gives off vapor, which contaminates the air of a room in which the cleaning of the compact disc is brought about. It is therefore readily apparent that the volatile cleaning agent is a health hazard unless the improvements are made on the operation of the conventional machines for cleaning the compact disc.

SUMMARY OF THE INVENTION

It is therefore the primary objective of the present invention to provide an automatic machine for cleaning a compact disc. The automatic machine of the present invention is free from all deficiencies of the conventional machines described above.

In keeping with the principle of the present invention, the foregoing objective of the present invention is attained by an automatic machine comprising a housing, a motor, a transmission mechanism, a disc carrying seat, an application device, a drying device, a first lifting mechanism, a second lifting mechanism, and a control device. The motor is located in the housing and controlled by the control device. The power of the motor is transmitted by the transmission mechanism to drive the disc carrying seat on which a compact disc to be cleaned is rotatably located. The application device is contiguous to the disc carrying seat and is driven by the power of the motor via the transmission mechanism to rotate. The first lifting mechanism is disposed in the housing and is located between the transmission mechanism and the application device to drive the application device to move toward or away from the compact disc. The second lifting mechanism is located between the transmission mechanism and the drying device for driving the drying device to move toward or away from the compact disc which has been cleaned.

The foregoing objective, features and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
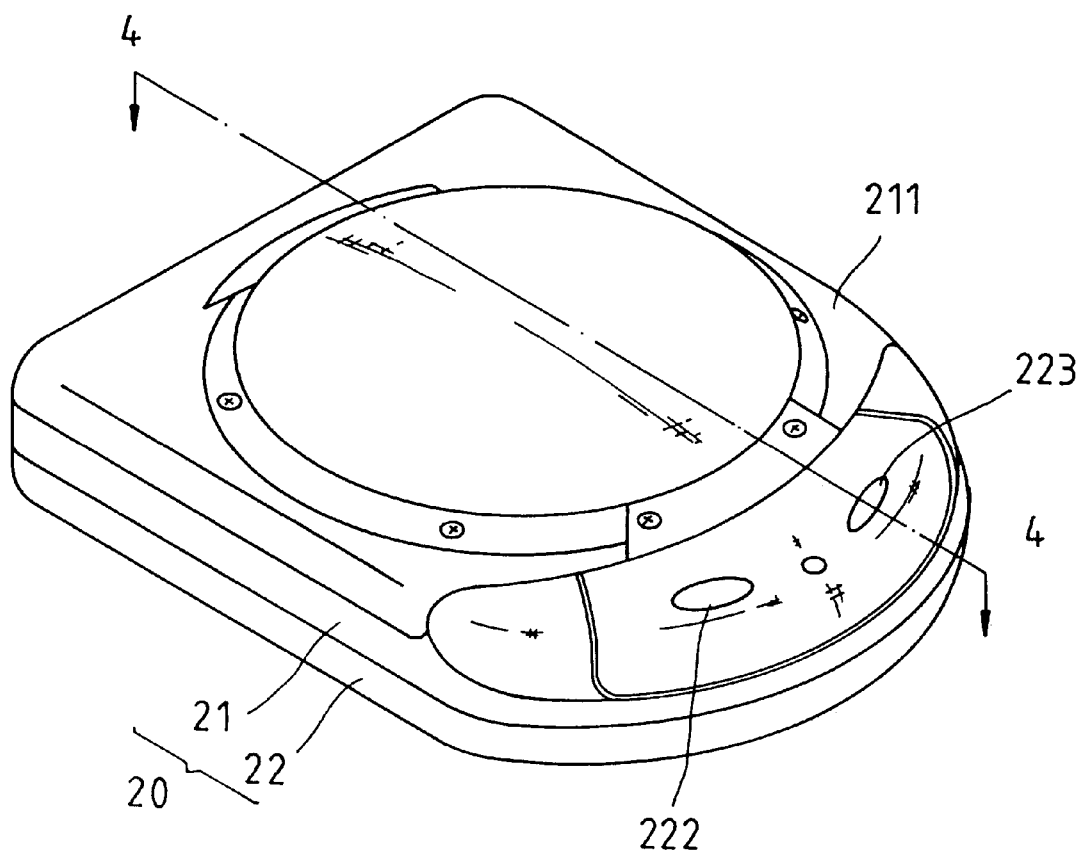
FIG. 1 shows a perspective view of the preferred embodiment of the present invention.
Figure 2:
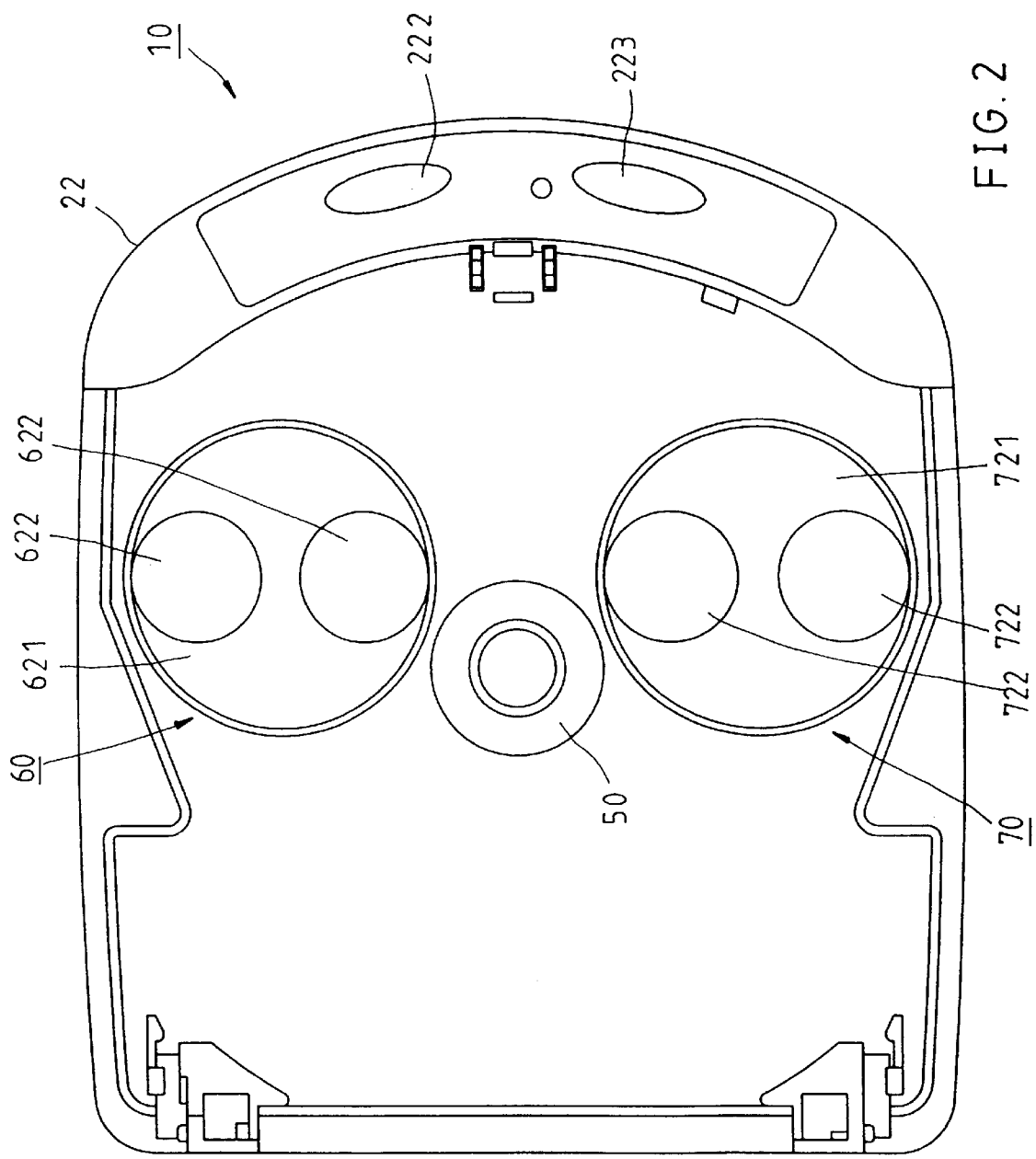
FIG. 2 shows a top view of the preferred embodiment of the present invention with a cover plate thereof being removed.
Figure 3:
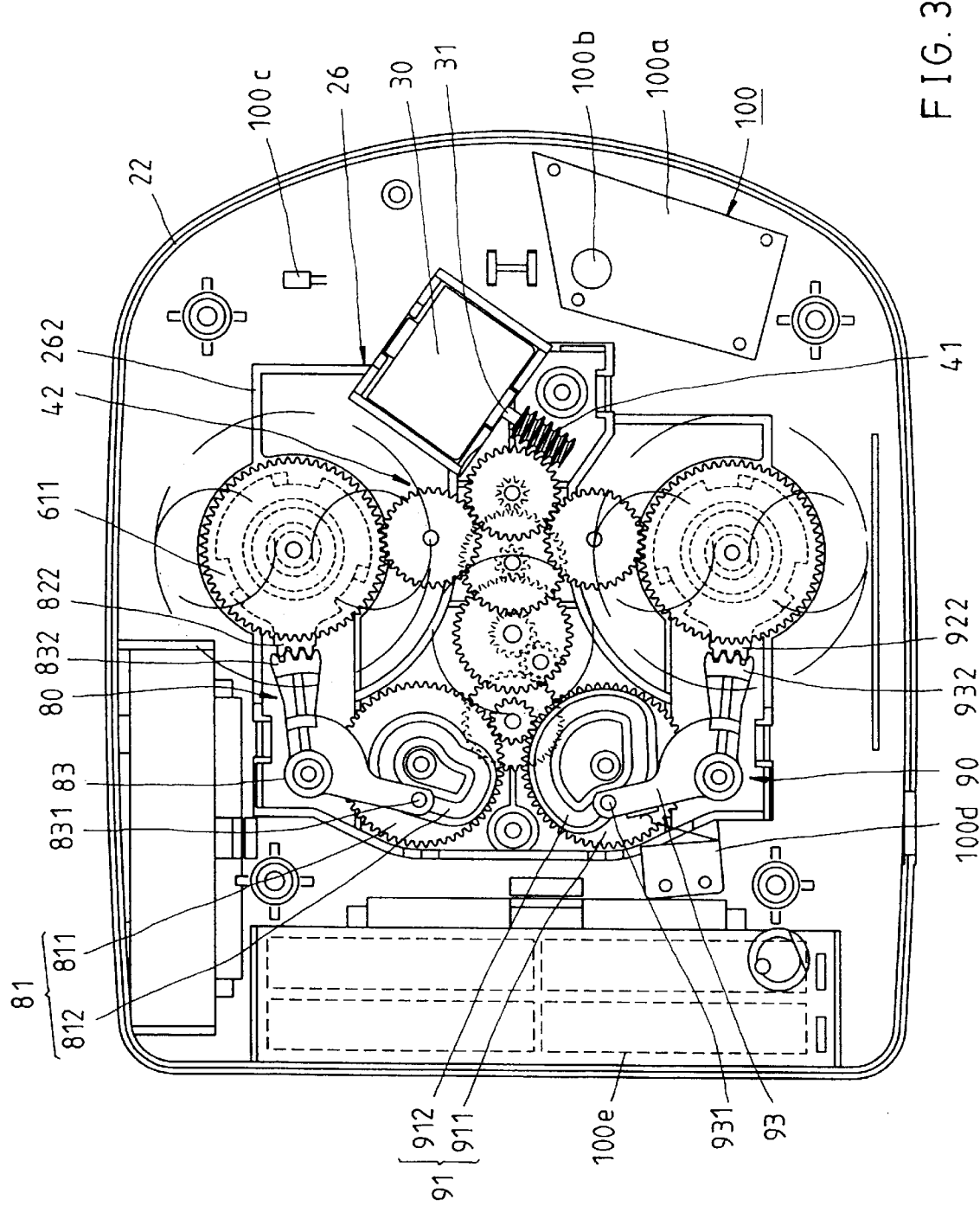
FIG. 3 shows a top view of the preferred embodiment of the present invention with an upper housing thereof being removed.

As shown in FIGS. 1–3, a compact disc cleaning machine 10 of the preferred embodiment of the present invention comprises a housing 20, a motor 30, a transmission mechanism 40, a disc carrying seat 50, an application device 60, a drying device 70, a first lifting mechanism 80, a second lifting mechanism 90, and a control device 100.

The housing 20 comprises an upper housing body 21, a lower housing body 22 connected with the upper housing body 21, a cover plate 211 fastened pivotally with the upper end of the upper housing body 22 and provided at the center thereof with a press disk 212 fastened pivotally therewith for pressing a compact disk 300 to be cleaned. The compact disk 300 is received in a receiving space 23 which is formed between the cover plate 211 and the upper housing body 22. The upper housing body 22 is provided in the periphery thereof with a cover plate opening key 222 and a power starting key 223. The cover plate 211 and the upper housing body 21 are similar in construction to those of the prior art. The lower housing body 22 is provided at the center thereof with a transmission box 26 which is formed of an upper cover body 261 and a lower cover body 262. The motor 30 is housed in the transmission box 26.

Figure 4:
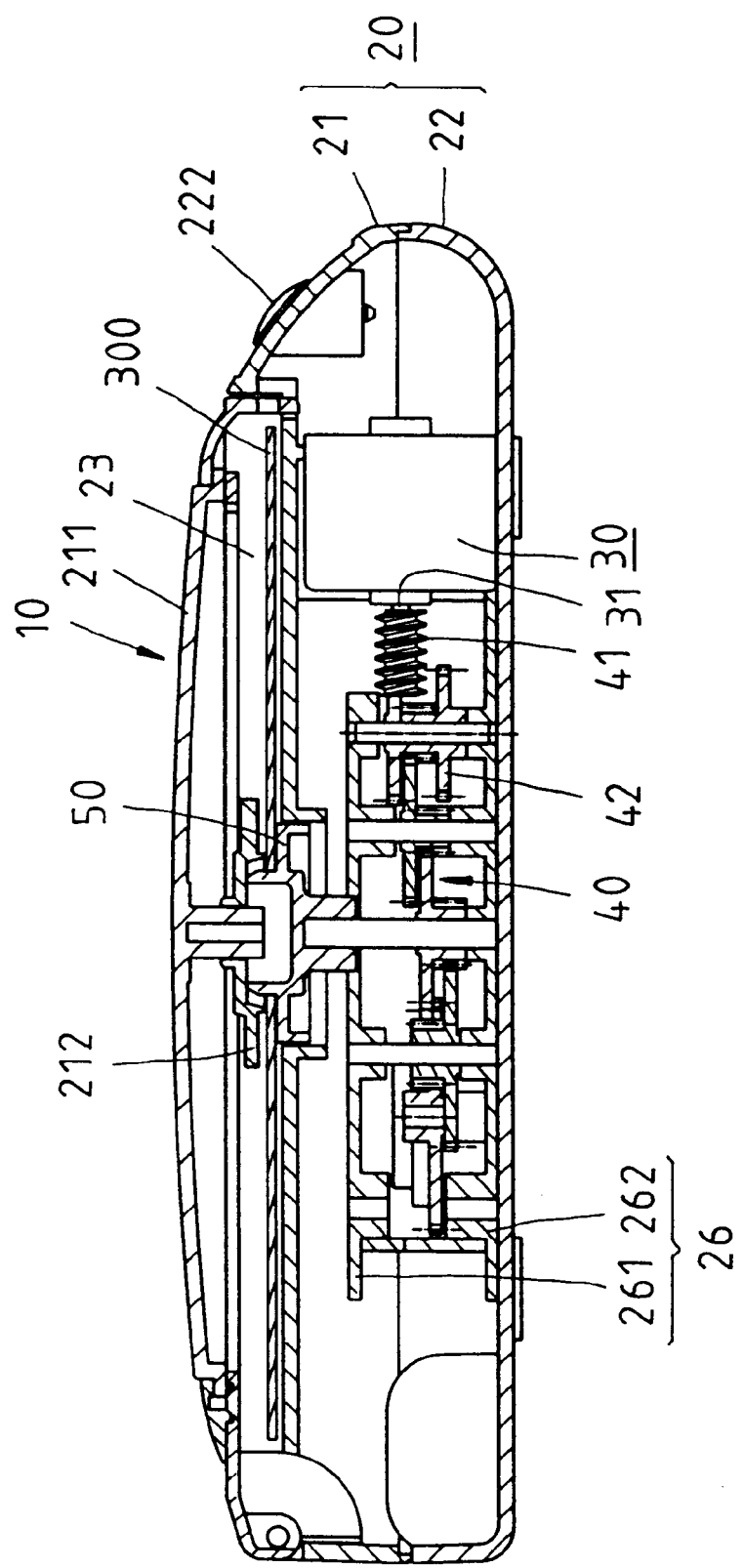
FIG. 4 shows a sectional view taken along the direction indicated by a line 4—4 as shown in FIG. 1.

As shown in FIGS. 3 and 4, the transmission mechanism 40 is disposed in the transmission box 26 such that a threaded rod 4 thereof is engaged with a rotary shaft 31 of the motor 30. The transmission mechanism 40 has a gear set 42 which is actuated by the threaded rod 41 and is formed of a plurality of gears engaging one another and different from one another in the tooth number.

As shown in FIGS. 2 and 4, the disc carrying seat 50 is of a disk-shaped construction and is disposed on the gear set 42 for carrying the compact disc 300 such that the compact disc 300 is rotated at the time when the transmission mechanism 40 is in action.

Figure 5:
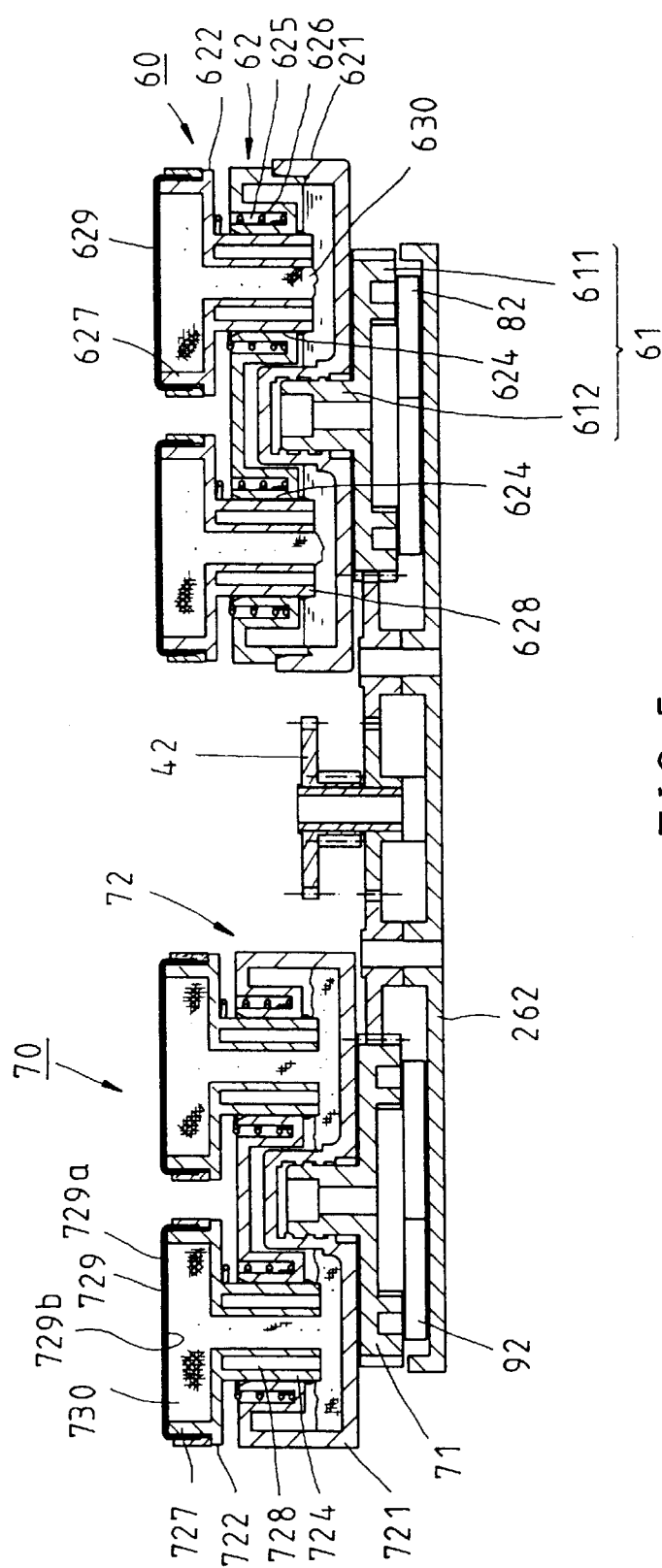
FIG. 5 shows a schematic view of the application device and the drying device of the preferred embodiment of the present invention.

Now referring to FIG. 5, the application device 60 is shown to locate at one side of the gear set 42 and is formed of a first gear member 61 and an application member 62. The first gear member 61 is engaged with the gear set 42 and is formed of a first gear 611 and a threaded pillar 612 disposed at the center of the first gear 611. The application member 62 comprises a first container 621 and two application heads 622. The first container 621 is intended to hold a liquid for cleaning the compact disc 200 and is provided at the bottom of a center thereof with a threaded recess 623 which is engaged with the threaded pillar 612. The first container 621 is provided in the top thereof with two through holes 624 which are provided in the outer edge thereof with a circular groove 625 in which a spring 626 is disposed. The application heads 622 have an end portion 627 with a round slot, and a hollow handle 628 extending outward from the center of the end portion 627. The end portion 627 is provided with a wiper 629 which is made of an artificial leather for wiping the compact disc 300. The end portion 627 and the hollow handle 628 are filled with a cotton piece 630. The two handles 628 of the two application heads 622 are inserted into the two through holes 624 such that the liquid cleaning agent is carried to the wiper 629 of the end portion 627 by siphonage of the cotton piece 630.

As shown in FIG. 5, the drying device 70 is disposed on other side of the gear set 42 and is basically similar in construction to the application device 60, with the difference being that the drying device 70 has a drying head 722 with an end portion 727 which is covered with a special cloth 729. The special cloth 729 has a water permeable surface 729a and a water impermeable surface 729b. The end portion 727 is filled with a cotton piece 730. The drying device 70 further comprises a handle 728 and a second container 721, which are filled with the cotton piece 730. The drying device 70 also including a second gear member 71 with the drying member 72 mounted on the second gear 71, whereby the second gear member is engaged with the gear set 42.

Figure 7:
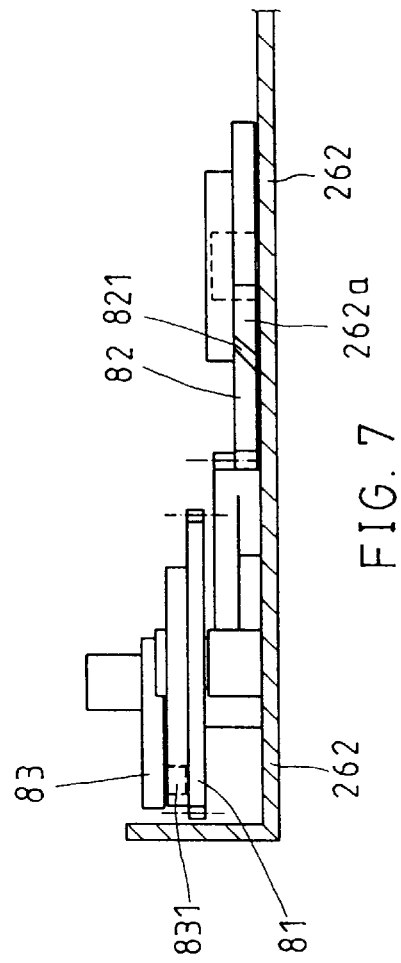
FIG. 7 shows a side view of the first lifting mechanism as shown in FIG. 6.
Figure 6:
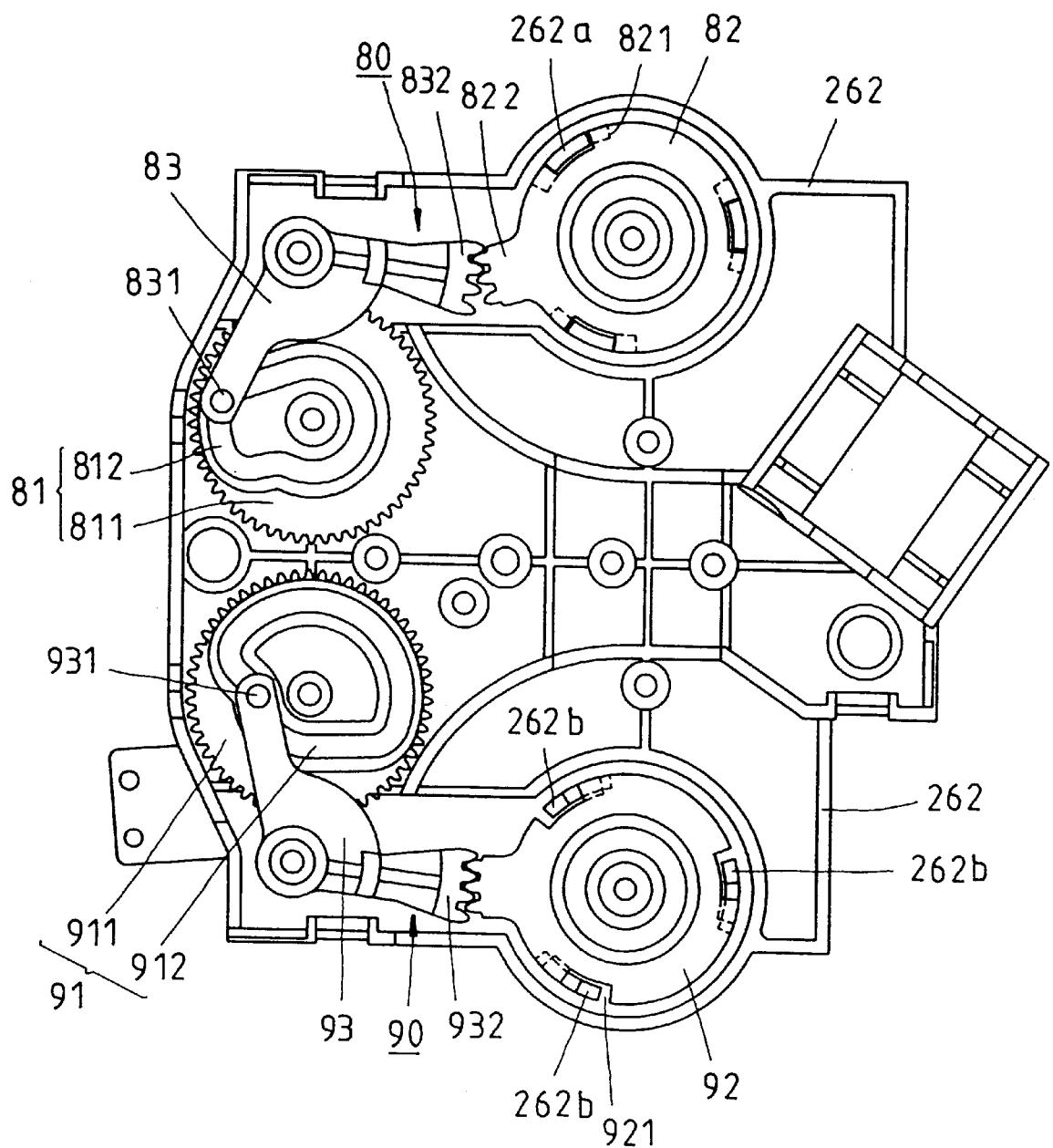
FIG. 6 shows a top view of the first lifting mechanism and the second lifting mechanism of the preferred embodiment of the present invention with an upper cover body thereof being removed.

As shown in FIGS. 6 and 7, the first lifting mechanism 80 comprises a third gear member 81 which is connected with the gear set 42 and is composed of a third gear 811 engaging the gear set 42, and a first slide rail 812 having a U-shaped cross section. The first slide rail 812 is mounted on the third gear 811. The application device 60 is mounted on a first lifting tray 82 which is provided in the outer edge thereof with three wedge-shaped slots 821 corresponding in location to the three wedge-shaped protrusions 262a of the lower cover body 262. The first lifting tray 82 is further provided in the outer edge thereof with a first rack 822 and a first connection rod 83 pivoted between the third gear member 81 and the first lifting tray 82. The first connection rod 83 is of an L-shaped construction and is provided at one end thereof with a roller 831 which is inserted into the first slide rail 812, and at other end thereof with a second rack 832 which is engaged with the first rack 822.

As shown in FIG. 6, the second lifting mechanism 90 comprises a fourth gear member 91 which is engaged with the gear set 42 and is formed of a fourth gear 911 and a second slide rail 912 having a U-shaped cross section. The fourth gear 911 is engaged with the gear set 42. The second slide rail 912 is mounted on the fourth gear 911. The drying device 70 is mounted on a second tray 92 which is provided in the outer edge thereof with three wedge-shaped slots 921 corresponding in location to the three wedge-shaped protrusions 262b of the lower cover body 262. The second lifting tray 92 is further provided in the outer edge thereof with a third rack 922 and a second connection rod 93 pivoted between the fourth gear 92 and the second lifting tray 92. The second connection rod 93 is of an L-shaped construction and is provided at one end thereof with a roller 931 which is inserted into the second slide rail 911, and at other end thereof with a fourth rack 932 which is engaged with the third rack 922.

The control device 100 comprises a circuit unit 100a, a first touch switch 100b, a second touch switch 100c, a third touch switch 100d, and a battery set 100e. Each touch switch is connected with the circuit unit 100a which is located in the lower housing body 22. The first touch switch 252 is connected with the power starting key 223. The second touch switch 253 is pressed by the upper housing body 21 to remain in the "ON" state so as to shut off the circuit at such time when the upper housing body 21 is detached. The third touch switch 254 is located at one side of the second connection rod 93 and is in contact with the second connection rod 93.

In operation, the cover plate 211 is first opened by pressing the cover plate opening key 222 so as to enable the compact disc 300 to be placed on the disc carrying seat 50. The cover plate 211 is then closed before pressing the power starting key 223 to start the cleaning machine 10 of the present invention. In light of the first slide rail 812 being different in design from the second slide rail 912, the first lifting mechanism 83 is first actuated to operate such that the application device 60 is lifted to enable the two application heads 622 to apply the liquid cleaning agent on the compact disc 300. As soon as the application process is completed, the application device 60 is lowered to return to its original position. The second lifting mechanism 90 is subsequently actuated to raise the drying device 70 such that the cleaning agent on the compact disc 200 is wiped out by the two drying heads 722. After the drying device 70 is lowered to return to its original position, the second connection rod 93 touches the third touch switch 254, thereby resulting in the interruption of the power supply to the motor 30 by the control device 25.

What is claimed is:

1. An automatic machine for cleaning a compact disc, said machine comprising:

a housing;

a motor located in said housing;

a transmission mechanism disposed in said housing for transmitting power of said motor;

a control device housed in said housing for controlling said motor;

a disc carrying seat driven by said transmission mechanism to rotate for carrying a compact disc to be cleaned;

an application device located in said housing such that said application device is adjacent to said disc carrying seat, and that said application device is driven to rotate by the power of said motor via said transmission mechanism;

a drying device housed in said housing such that said drying device is adjacent to said disc carrying seat, and that said drying device is driven to rotate by the power of said motor via said transmission mechanism;

a first lifting mechanism located in said housing and connected between said transmission mechanism and said application device such that said application device is driven to move toward or away from said disc carrying seat by the power of said motor via said transmission mechanism; and a second lifting mechanism located in said housing and connected between said transmission mechanism and said drying device such that said drying device is driven to move toward or away from said disc carrying seat by the power of said motor via said transmission mechanism.

2. The machine as defined in claim 1, wherein said housing comprises an upper housing body and a lower housing body connected with said upper housing body, said upper housing body comprising a cover plate pivoted to said upper housing body and provided with a press disk corresponding in location to said disc carrying seat.

3. The machine as defined in claim 2, wherein said lower housing body is provided with a transmission box formed of an upper cover body and a lower cover body whereby said transmission box houses said motor, said transmission mechanism, said drying device, said first lifting mechanism, and said second lifting mechanism.

4. The machine as defined in claim 1, wherein said transmission mechanism comprises a threaded rod and a gear set formed of one or more gears whereby said threaded rod is engaged with said motor.

5. The machine as defined in claim 1, wherein said drying device comprises a first gear member and an application member mounted on said first gear member whereby said first gear member is engaged with said gear set.

6. The machine as defined in claim 5, wherein said application device comprises a first container and one or more application heads which are disposed on said first container and are in communication with said first container, said application heads being provided with an application cloth which is in turn connected with a cotton piece in contact with a compact disc cleaning agent contained in said first container.

7. The machine as defined in claim 1, wherein said drying device comprises a second gear member and a drying member mounted on said second gear member whereby said second gear member is engaged with said gear set.

8. The machine as defined in claim 7, wherein said drying member comprises a second container and one or more drying heads which are disposed on said second container and are in communication with said second container, said drying heads being provided with a drying cloth having a water permeable surface and a water impermeable surface whereby said water permeable surface is used for drying the compact disc whereby said drying cloth is connected with a cotton strip in contact with a liquid absorbing material contained in said second container.

9. The machine as defined in claim 1, wherein said first lifting mechanism comprises a third gear connected with said transmission mechanism and provided with a first slide rail, and a first lifting tray for mounting said application device, said first lifting tray provided with a plurality of wedge-shaped slots corresponding in location to a plurality of wedge-shaped protrusions of said lower cover body, said first lifting tray further provided with a first rack and a first connection rod located between said third gear and said first lifting tray whereby said first connection rod is provided at one end thereof with a roller which is inserted into said first slide rail, and at other end thereof with a second rack which is engaged with said first rack.

10. The machine as defined in claim 1, wherein said second lifting mechanism comprises a fourth gear, a second slide rail mounted on said fourth gear which is connected with said transmission gear, and second lifting tray for mounting said drying device, said second lifting tray being provided with a plurality of wedge-shaped slots corresponding in location to a plurality of wedge-shaped protrusions of said lower cover body, said second lifting tray further provided with a third rack and a second connection rod located between said fourth gear and said second lifting tray whereby said second connection rod is provided at one end thereof with a roller which is inserted into said second slide rail, and at other end thereof with a fourth rack which is engaged with said third rack.

11. The machine as defined in claim 1, wherein said control device comprises a circuit unit, a plurality of touch switches, and a battery set.

* * * * *